Jan. 12, 1965   H. O. KESKITALO   3,165,347
PIPE GRAPPLER

Filed May 9, 1962   2 Sheets-Sheet 1

INVENTOR.
HOWARD O. KESKITALO
BY
Fryer and Zimwald
ATTORNEYS

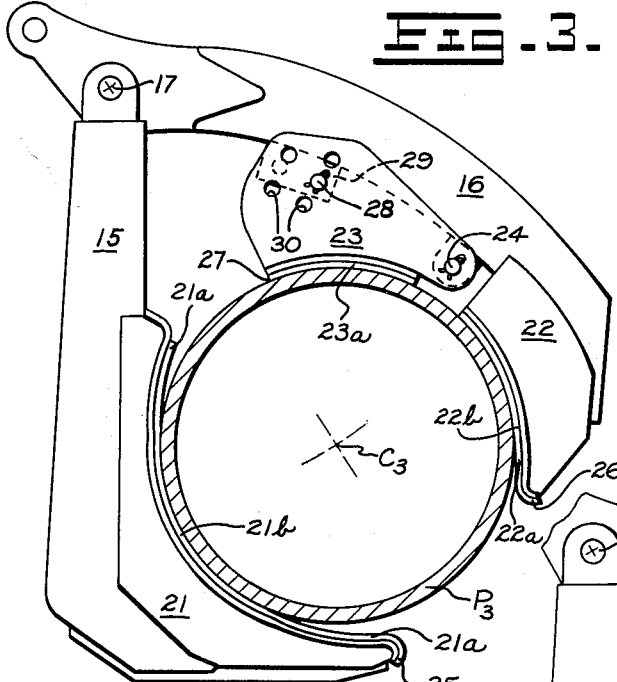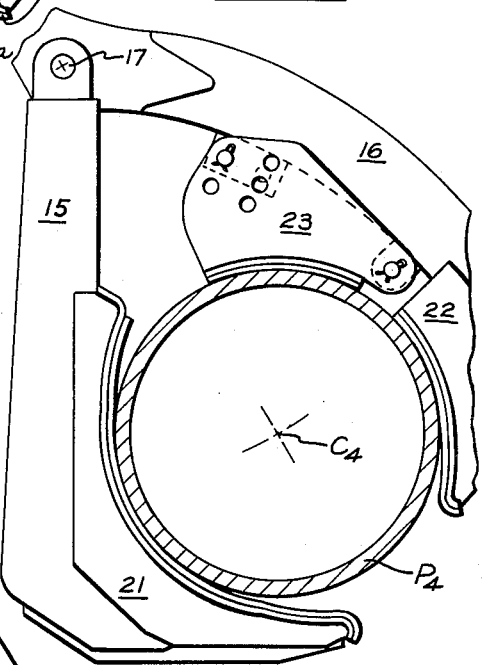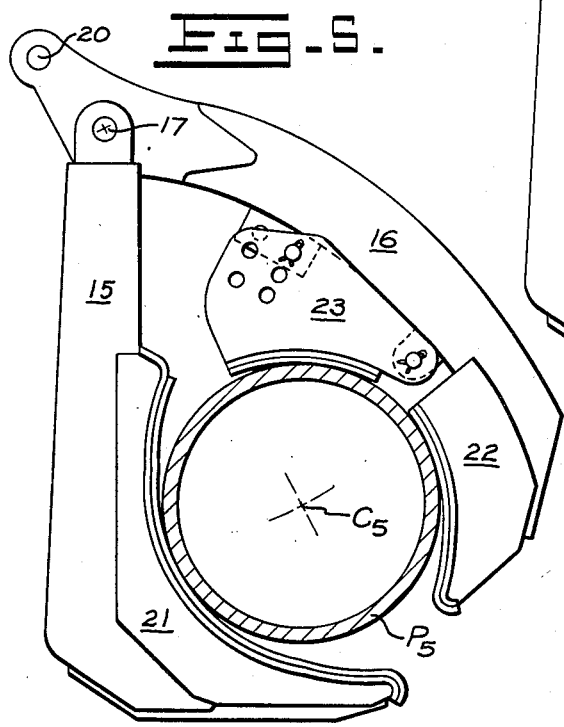

United States Patent Office 3,165,347
Patented Jan. 12, 1965

3,165,347
PIPE GRAPPLER
Howard O. Keskitalo, Batavia, Ill., assignor to Caterpillar Tractor Co., Peoria, Ill., a corporation of California
Filed May 9, 1962, Ser. No. 193,441
6 Claims. (Cl. 294—88)

This invention relates to a pipe grappler and more particularly relates to a grappling mechanism adapted to be used in conjunction with a lift fork of a vehicle for transporting cylindrical articles having various diameters.

The problem of preventing damage to a pipe while it is being transported by the lift fork of a vehicle, for example, is particularly apparent when such a vehicle must adapt itself to pipes having various diameters. This problem is greatly pronounced when it is desired to transport pipe comprising a wrapped outer layer of impregnated cloth or felt which is relatively fragile in nature. When such a pipe is clamped or otherwise secured to a transporting vehicle, it is generally marred or damaged. These pipes may range up to 80 feet in length and 26,500 lbs. in weight.

Attempts have been made to remedy this problem by employing resilient pads on the lift fork of the vehicle or by utilizing chain-like clamping devices, etc. Such solutions have not fully solved the problem of preventing damage to the transported pipes, particularly of the fragile type.

This invention has overcome the above described difficulties by providing a pipe grappler which is adapted to prevent damage to pipes of various sizes. The grappler comprises a first seating means for snugly receiving and adapting itself to pipes of various sizes and an adjustable second seating means which is pivotally mounted to be selectively arranged in opposed relation to the first seating means for also snugly retaining the pipe. With this arrangement, pipes of various sizes may be safely transported without incurring damage thereto.

An object of this invention is to provide a pipe grappler for transporting cylindrical articles of various sizes without incurring damage thereto.

A further object of this invention is to provide a pipe grappler which may be easily adapted for use with a lift fork of a vehicle whereby pipes of various sizes may be expeditiously and safely transported.

A further object of this invention is to provide a pipe grappler which is relatively simple and durable in construction and efficient in operation.

Figure 1:
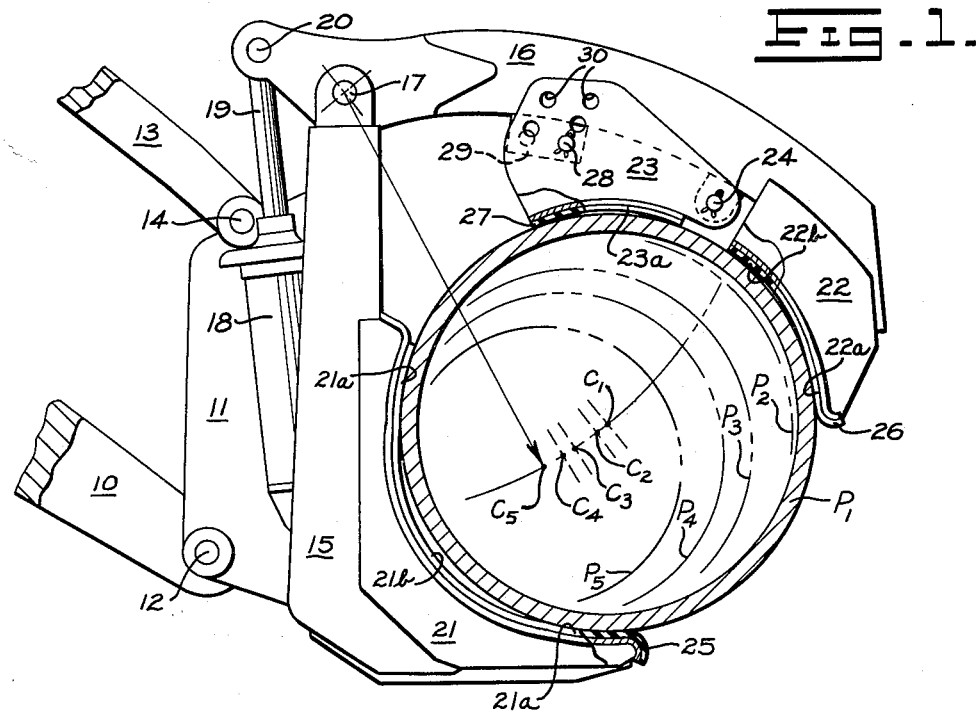

Other and more specific objects of this invention will become apparent from the following description and drawings wherein:

FIG. 1 is an elevational view disclosing the pipe grappler of this invention as it would appear in operative association with a vehicle lift fork and securing a pipe having a first given diameter therein; and FIGS. 2-5, inclusive, disclose the pipe grappler of FIG. 1 as it would appear in securing relationship with pipes having progressively smaller diameters than the pipe shown in FIG. 1.

As disclosed in FIG. 1, laterally spaced lift arms 10 (only one is shown) pivotally mount a standard 11 of the grappler by means of pivot shaft 12. Tilt arms 13 (only one is shown) are pivoted on the standard by means of a pivot shaft 14. Thus, the grappler may be selectively lifted by means of arms 10 and tilted by arms 13 in a conventional manner.

A tine 15 is secured to the standard 11 and has one or more clamping arms 16 mounted thereon by pivot shaft 17. One or more hydraulic jacks 18 are pivotally secured (pivot not shown) to the standard and provide a reciprocating piston rod 19 which is pivotally mounted onto the clamping arm by pivot pin 20. The hydraulic jack operatively communicates with a suitable hydraulic power source of the vehicle in order to selectively pivot the clamping arm with respect to the tine for pipe securing purposes, as shown.

Novel concepts of this invention comprise the arrangement of one or more shoes or seating means 21 on the tine which function to cooperate with shoes or second seating means 22 and 23 arranged on the clamping arm for snugly securing a pipe therebetween. Shoe 23 is pivotally mounted on pin 24 and thus adapted for adjustment to pipes having various diameters.

As shown in FIG. 1, the pipe grappler is adapted to snugly secure pipes $P_1$, $P_2$, $P_3$, $P_4$ and $P_5$, having centers $C_1$–$C_5$, respectively. As shown for illustration purposes, the shoe 21 is formed with first arcuate surface portions 21a which conform to the peripheral surface portions of the largest pipe $P_1$ and intermediate or second arcuate surface portions 21b which correspond to the outer dimensions of intermediate pipe $P_3$. A resilient padding 25, such as rubber, is preferably bonded onto shoe 21 to afford a firm surface-to-surface contact between the various sized pipes and the shoe. Shoe 22 provides first arcuate surface portions 22a conforming to the outer dimensions of pipe $P_1$ and second arcuate surface portions 22b conforming to the periphery of pipe $P_3$.

The pivotal shoe 23 has a resilient padding 27 bonded to an arcuate surface 23a thereof which preferably conforms to the outside dimensions of intermediately sized pipe $P_3$. During the clamping of any particular pipe, shoe 23 is held in position by means of a removable pin 28 which cooperates with one of two apertures formed in a lug 29 of the clamping arm and further cooperates with one of the five adjusting apertures 30 formed in the bifurcated side plates of shoe 23.

In the position shown in FIG. 1, the grappling mechanism is effective to firmly secure pipe $P_1$ through the resilient paddings by means of surfaces 21a of shoe 21, surface portions 22a and the surface portions at the other end of shoe 22, and the extreme end portions of surface 23a of shoe 23. Due to this unique arrangement, under the clamping pressure, the resilient paddings spread out somewhat to afford surface rather than line contact at the extreme end portions of surface portions 23a of shoe 23, for example. As will be hereinafter more fully understood, this action provides a tolerance which is utilized to adapt the grappler to pipes having a relatively wide range of outside diameters.

It should be further noted in FIG. 1 that the arc which is struck by a radius extending from pivot pin 17 to the center of pipe $P_1$, intersects the centers of all of the pipes. Thus, shoes 21 and 22 may be arranged and shoe 23 may be adjusted with respect to the particular pipe secured in order to impart the maximum of reaction forces on the shoes toward the center of such a pipe. Also, the reaction forces of shoe 21 are at all times substantially directly opposed to the reaction forces of shoes 22 and 23 to thus prevent a distortion or other damage to the pipe. This desired result is aided by the fact that the loci of the centers C of the various pipes, as shown in FIG. 1, is parallel to an arc (not shown) struck from pivot 17 and passing midway between shoes 22 and 23.

Figure 2:
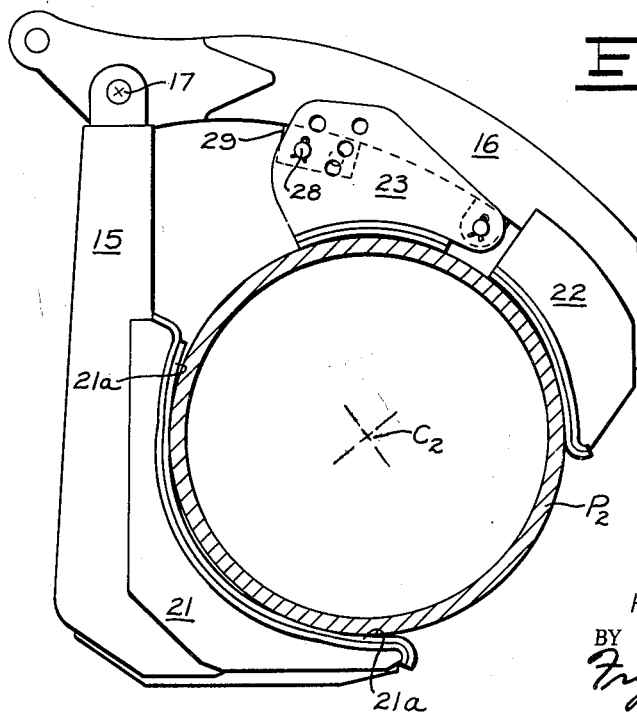

As disclosed in FIG. 2, shoe 23 is repositioned and set by means of removable pin 28 which is projected through a second adjustment aperture formed in the shoe and a second aperture formed in lug 29. The hydraulic jack is then actuated to pivot the clamping arm closer to the standard 11 to secure a pipe $P_2$ therein which has a relatively smaller diameter than pipe $P_1$. As shown, none of the surfaces formed on the shoes exactly match the outside dimensions of pipe $P_2$. However, the resilient paddings will slightly spread to afford sufficient surface contacts similar to those shown in FIG. 1 so that the pipe will not be damaged. Thus, the surface portions 21a of shoe 21, for example, will afford substantial seating support to the relatively smaller pipe.

FIG. 3 discloses the grappling mechanism rearranged with the clamping arm pivoted and the shoe 23 adjusted in the hereinbefore described manner for securing a third pipe $P_3$, having a still smaller diameter. As hereinbefore stated, surface portions 21b of shoe 21, surface portions 22b of shoe 22, and surface portions 23a of shoe 23 form curved surface portions conforming to the outer dimensions of this pipe. Thus, the pipe will be firmly secured without having to employ the inherent tolerances afforded by the resilient paddings. FIGS. 4 and 5 disclose pipes $P_4$ and $P_5$, respectively, secured by the grappler in much the same manner as hereinbefore described in connection with FIGS. 1–3. In these cases, the resilient paddings will function in much the same manner as hereinbefore discussed in connection with FIG. 2 in order to afford surface contacts substantially similar to those disclosed in FIG. 3.

In actual practice pipes $P_1$, $P_2$, $P_3$, $P_4$ and $P_5$ have been constructed to have outside diameters of 36, 34, 30, 28 and 24 inches, respectively. Thus, it has been found that the novel concepts of this invention may be applied to a range of pipe diameters where the smallest pipe has a diameter which is two-thirds that of the largest pipe. It should be understood, however, that the novel concepts of this invention may be applied to pipes having a slightly wider range of outside diameters different from that above mentioned so long as the novel securing features of this invention are used.

Also, although paddings have been mentioned as applied to the seating surfaces of the shoes, such padding may not be necessary in many transportation operations wherein the compensation features afforded by the unique arrangement of the arcuate seating surfaces are sufficient to prevent damage to the transported article. It should be further understood that more individual arcuate surface portions may be formed on the shoes if so desired. For example, shoe 21 may be formed with a third arcuate surface portion at the mid-portion thereof, conforming to the outside diameter of pipe $P_5$.

I claim:
1. A grappler mounted on a vehicle for snugly securing cylindrical articles of circular cross-section having a predetermined range of outside diameters defined by a first cylindrical article with the largest outside diameter and a second cylindrical article with the smallest outside diameter comprising: a first tine member having first seating means fixedly mounted thereon, said first tine member arranged to be held in a stationary position relative to said vehicle, a second tine member pivotally mounted on the first tine member, means for pivoting said second tine member relative to the first tine member, said second tine member having a second seating means thereon arranged in opposed relationship to said first seating means, said first seating means having a pair of first arcuate surface portions formed thereon each having a diameter adapted to conform to the outer periphery of the cylindrical article having the largest outside diameter and further having a second arcuate surface portion formed thereon having a diameter adapted to conform to the outer periphery of the cylindrical article having the smallest outside diameter, said second arcuate surface portion being formed between the pair of first arcuate surface portions on said first seating means, said second seating means with at least one arcuate surface formed thereon having a diameter adapted to conform to the outer periphery of the cylindrical article having the largest outside diameter and further having a second arcuate surface portion of a diameter adapted to conform to the outer periphery of the cylindrical article having the smallest outside diameter, so that an arc formed by a movement of a fixed radius extending from said pivot point of said tine members to a position intermediate the seating means and arranged to pass through the axis of said first cylindrical article, when the first cylindrical article is secured between said seating means, also passes through the axis of said second cylindrical article, when said second cylindrical article is secured between said seating means.

2. The invention of claim 1 further comprising resilient padding means formed on the arcuate surface portions of said first and second seating means for aiding in the provision of a surface-to-surface contact with said articles when they are held in said grappler.

3. The invention of claim 1 further comprising means for adjustably attaching a portion of said second seating means to said second tine member for aiding the grappler to adapt itself to said articles.

4. A pipe grappler mounted on a vehicle for gripping at least a first cylindrical article and a second cylindrical article having a smaller outside radius than the first cylindrical article comprising: a first tine member arranged to be held in a stationary position relative to said vehicle and having a first shoe fixedly secured thereto, a shaft on said first tine member pivotally mounting a second tine member, means for pivoting said second tine member relative to said first tine member, a second shoe fixedly mounted on said second tine member, a pivot pin on said second tine member mounting a third shoe adjacent to said second shoe, adjustment means between said third shoe and said second tine member adjacent to said pivot shaft to fix said shoe in selective angular positions on said pivot pin so an arc formed by a movement of a fixed radius extending from the center of said pivot shaft to a position intermediate said shoes and arranged to pass through the axis of said first cylindrical article when said first cylindrical article is gripped between said first, second, and third shoes passes through the axis of said second cylindrical article when said second cylindrical article is gripped between said first, second and third shoes, the axis of said first cylinder forming a center for first arcuate surface portions formed on said first and second shoes and the axis of said second cylinder forming a center for a second arcuate surface portion formed on said first, second, and third shoes.

5. The invention of claim 4 further comprising resilient padding means formed on the surface portions of said shoes.

6. The invention of claim 4 wherein the second arcuate surface portions of said first shoe are arranged intermediate of the first arcuate surface portions thereof and the second arcuate surface portions of said second shoe are arranged adjacent to said third shoe.

References Cited in the file of this patent

UNITED STATES PATENTS

| 486,764 | Carpenter | Nov. 22, 1892 |
| 1,807,360 | Wehr | May 26, 1931 |
| 2,752,055 | Hoppert | June 26, 1956 |
| 3,034,821 | Hackett et al. | May 15, 1962 |

FOREIGN PATENTS

| 483,632 | Germany | of 1928 |
| 27,613 | Great Britain | of 1911 |